Sept. 22, 1964 S. PAULL 3,150,329

VARIABLE FREQUENCY MAGNETIC MULTIVIBRATOR

Filed March 11, 1960 3 Sheets-Sheet 1

INVENTOR
STEPHEN PAULL

BY

ATTORNEYS

Sept. 22, 1964 S. PAULL 3,150,329

VARIABLE FREQUENCY MAGNETIC MULTIVIBRATOR

Filed March 11, 1960 3 Sheets-Sheet 2

INVENTOR
STEPHEN PAULL

BY

ATTORNEYS

INVENTOR
STEPHEN PAULL

BY

ATTORNEYS

United States Patent Office 3,150,329
Patented Sept. 22, 1964

3,150,329
VARIABLE FREQUENCY MAGNETIC MULTIVIBRATOR

Stephen Paull, Falls Church, Va., assignor to the United States of America as represented by the Administrator of National Aeronautics and Space Administration
Filed Mar. 11, 1960, Ser. No. 14,488
18 Claims. (Cl. 331—113)
(Granted under Title 35, U.S. Code (1952), sec. 266)

The invention described herein may be manufactured and used by or for the Government of the United States of America for governmental purposes without the payment of royalties thereon or therefor.

This invention relates generally to magnetic-coupled multivibrator circuitry, and more particularly to a variable frequency magnetic-coupled multivibrator.

Although variable frequency magnetic-coupled multivibrator arrangements have been heretofore devised and successfully employed, in general, these prior art arrangements have not been found to be entirely satisfactory. For example, in one prior art multivibrator arrangement, frequency variation is obtained by changing the magnitude of the supply voltage. This arrangement results in undesirable variations in amplitude and waveform of the multivibrator signal. In another present day arrangement, frequency change is obtained by short-circuiting windings on one or more serially-connected cores. One significant disadvantage of this arrangement is that the frequency of the multivibrator signal can only be varied is discrete steps. Still another prior art variable frequency multivibrator arrangement provides for the application of a variable reversible current to control windings individually linking each core in a push-pull type of multivibrator circuit. The several limitations of this arrangement are the relatively large magnitude of control current required, non-linearity of the control current-frequency characteristic over a particular frequency band, and waveform distortion.

Accordingly, it is an object of the present invention to provide a new and improved variable frequency magnetic-coupled multivibrator circuit.

Another object of this invention is to provide a novel magnetic-coupled multivibrator in which the frequency of the output signal is continuously variable over a predetermined frequency range.

Still another object of the instant invention is the provision of a novel voltage control variable frequency magnetic core multivibrator.

A further object of this invention is to provide a novel single polarity unidirectional potential controlled variable frequency magnetic-coupled multivibrator.

A still further object of the present invention is to provide a variable frequency magnetic-coupled multivibrator having an output signal of constant amplitude and waveform.

Another still further object of this invention is the provision of linear control means for a variable frequency multivibrator.

Still another further object of the present invention is to provide a new and improved variable frequency magnetic-coupled multivibrator having an output signal free of random variations of period during each half-cycle of operation.

According to the present invention, the foregoing and other objects are attained by the provision of a plurality of high remanence cores, an electrical energy source, a pair of conductive loops including windings linking each of the cores and coupled across the energy source, switching means included in each of the loops for rendering them alternately operative, circuit means including windings linking each of the cores for effecting reliable operation of the switching means, a control winding linking all but one of the cores, and circuit means for applying a variable unidirectional signal of one polarity to the control winding.

A more complete appreciation of the invention and many of the attendant advantages thereof will be readily apparent as the same becomes better understood by reference to the following detailed description when considered in connection with the accompanying drawings wherein.

Figure 1:
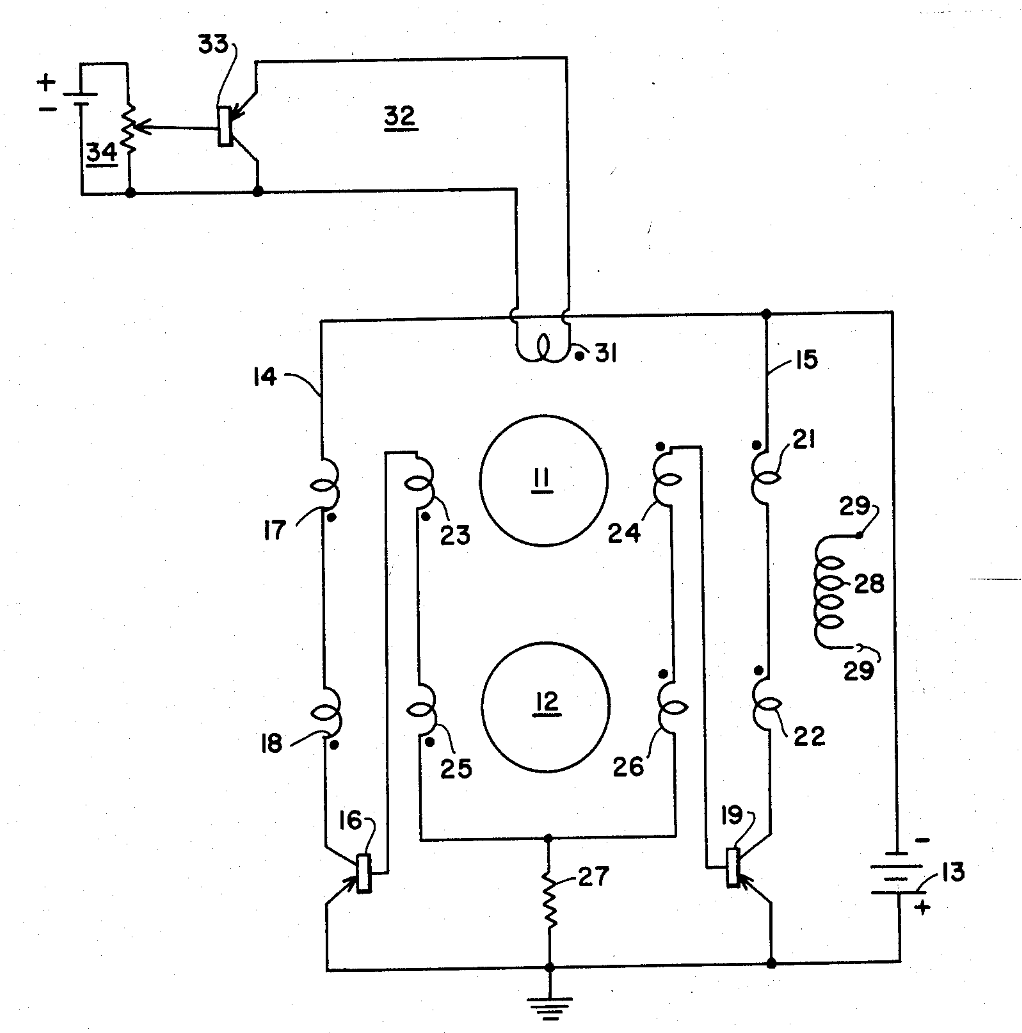
FIG. 1 is a schematic view of one embodiment of this invention.

Referring now to the drawings wherein like reference numerals designate identical or corresponding parts throughout the several views, and more particularly to FIG. 1 wherein one embodiment of the variable frequency multivibrator according to the present invention is shown as consisting essentially of a pair of toroidal cores 11 and 12 formed of magnetic material exhibiting a square loop hysteresis characteristic, a unidirectional electrical energy supply, such for example as a battery 13, and a pair of conductive loops, or paths, 14 and 15 coupled across the battery 13. The inside diameters of toroids 11 and 12 are preferably of identical size, although the cross-sectional areas thereof need not be. Conductive loop 14 includes a switching element 16 and serially connected identical windings 17 and 18 individually linking cores 11 and 12, respectively. Conductive loop 15 consists of switching element 19 and serially connected identical windings 21 and 22 individually linking cores 11 and 12, respectively. The windings in each of the loops are poled to produce flux changes in opposite directions in the high remanence magnetic cores. Switching elements 16 and 19, such as for example PNP type transistors, are used to perform a switching function and keep the loops alternately operative, although it is to be understood that electron tubes can also be employed for this purpose.

As is well known in the art, in the operation of a PNP type transistor as an on-off switching element, the collector to emitter impedance of the transistor is very high when both the collector and emitter voltages are equal to, or more negative than, the base voltage. However, as soon as the base becomes slightly negative with respect to the emitter, the collector to emitter impedance drops to an extremely low value.

High remanence magnetic cores 11 and 12 are also linked by windings 23–24 and 25–26, respectively. Windings 23 and 25 are serially connected between the base electrode of transistor 16 and one end of a resistor 27, while windings 24 and 26 are serially connected between the base electrode of transistor 19 and the same end of resistor 27. The other end of resistor 27 is connected to the emitter electrodes of the switching transistors and to the positive side of battery 13. Resistor 27 limits the base current flow to the conductive one of switching transistors to a value required to keep the conductive transistor fully on. Windings 23, 24, 25 and 26 are poled to provide a positive base voltage to one switching transistor and a negative base voltage to the other switching transistor during each half-cycle of multivibrator operation thereby assuring that one of the switching transistors will be on and the other one off. An output winding 28, which may either consist of series connected windings individually linking each of the cores, or a single winding common to both cores, as shown, is provided to couple the generated square wave signal to output terminals 29.

Core 11 of the multivibrator is linked by a winding 31 of a frequency control circuit 32. Also included in the control circuit is a signal translating element 33, such as PNP type transistor, and a conventional source 34 of a selectively variable single polarity direct current signal. Transistor 33 is operated in the common collector configuration with the direct current control signal being applied across the base and collector electrodes thereof and the control winding 31 being connected across the emitter and collector electrodes thereof. The control winding 31 is poled so that the voltage induced therein by the flux change in core 11 in response to a negative magnetizing force is in series-opposition to the control signal and will result in producing a net negative base-to-emitter potential on transistor 33. Transistor 33 is therefore turned on during this half-cycle and clamps the induced voltage to the level of the applied control signal thereby limiting the rate of flux change in core 11 to less than that of core 12. During the half-cycle that a positive magnetizing force is applied to core 11, the voltage induced in control winding 31 is in series-aiding with the control signal and transistor 33 is cut-off. This results in the absence of any clamping action during this half-cycle of multivibrator operation.

The multivibrator operating frequency is determined by the algebraic sum of the flux changes in cores 11 and 12 during each half-cycle. Since the flux changing windings are identical, the magnetizing forces applied to the cores during each half-cycle are of equal magnitude. However, during the clamping half-cycle when control transistor 33 is ON, current in the control winding opposes the applied magnetizing force and results in a slower rate of flux change in core 11. Core 12 reaches negative saturation while core 11 flux reversal is still in progress. The flux change in core 11 is zero when the input control voltage is zero, and increases to full flux reversal as the control voltage is increased to its maximum value. This maximum value is determined by the ratio of cross section area of core 11 to core 12, the number of turns of the control and flux changing windings, and the supply voltage. It therefore will be apparent that the multivibrator operating frequency is linearly variable from an upper frequency limit, when the control signal is zero with no flux reversal in core 11 and full flux reversal in core 12, to a lower frequency limit, when the control signal is maximum and complete flux reversal takes place in both cores.

It will be appreciated by those skilled in the art that since the variable frequency multivibrator according to this invention operates under constant switching conditions over the entire frequency range of operation, the generated output signal will exhibit constant amplitude and waveshape characteristics and will be free of random variations of period from cycle to cycle. It will also be appreciated that temperature effects on the switching transistors, which tend to cause frequency instability will be compensated for by the temperature effects on the clamping, or control, transistor.

Figure 2:
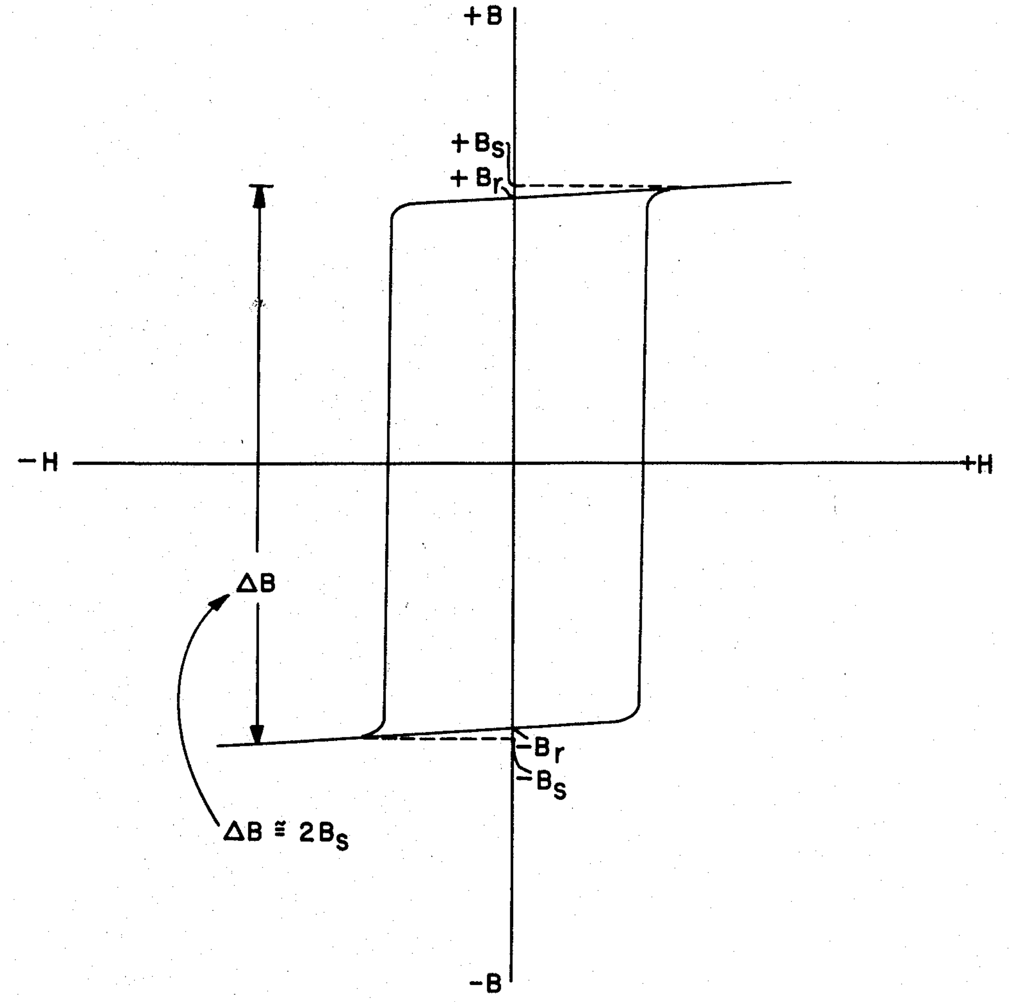
FIG. 2 is a graphical illustration of diverse operational phases of the present invention.

Having described the circuit elements and arrangement of the variable frequency multivibrator according to this invention, the operation thereof will now be described in relation to FIG. 2.

During the beginning of the initial half-cycle of operation let it be assumed that the flux density in both cores is at positive remanence, $+Br$, and that transistors 16, 19 and 33 are off, on, and on, respectively. The current flow in loop 15 produces a negative magnetizing force, $-H$, tending to drive both cores toward negative saturation, $-Bs$. Since both cores have equal inside diameters and identical flux changing windings, the applied magnetizing force is the same for both cores. However, by reason of the clamping action of control transistor 33 during this half-cycle, an induced current flows through control winding 31 which produces an opposing magnetizing force thereby limiting the rate of flux change in controlled core 11. The net magnetizing force on core 11 is therefore less than that on uncontrolled core 12 by an amount determined by the magnitude of the control signal provided by source 34. Core 12 reaches negative saturation, $-Bs$, while core 11 is still switching, whereupon voltages on all windings linking core 12 vanish. Since windings 24 and 26 furnish base drive for transistor 19, the moment core 12 saturates, the drive on transistor 19 diminishes suddenly whereupon this transistor is turned off and flip-flop action is initiated. The flux density of core 12 then returns to negative remanence, $-Br$, while the flux density of core 11 is at some value between negative and positive remanence depending upon the amount of clamping action taking place during the initial half-cycle.

At the initiation of the terminal half-cycle of operation, transistors 16, 19 and 33 will be on, off, and off, respectively. Current flows in loop 14 thereby producing a positive magnetizing force, $+H$, tending to drive both cores toward positive saturation, $+Bs$. However, the residual flux density on core 11 acts as a magnetic bias aiding the applied magnetizing force. Core 11 therefore begins its flux reset ahead of core 12. As core 11 nears positive saturation, $+Bs$, its rate of flux change decreases while that in core 12 increases. Since the total amount of flux change involved in this half-cycle is the same as took place in the initial half-cycle, both cores reach positive saturation, $+Bs$, in a time interval equal to the switching time of the initial half-cycle. When the cores saturate, the voltage across windings 23 and 25 diminishes suddenly thereby turning off transistor 16. Thereupon the aforedescribed operation repetitiously continues.

Figure 3:
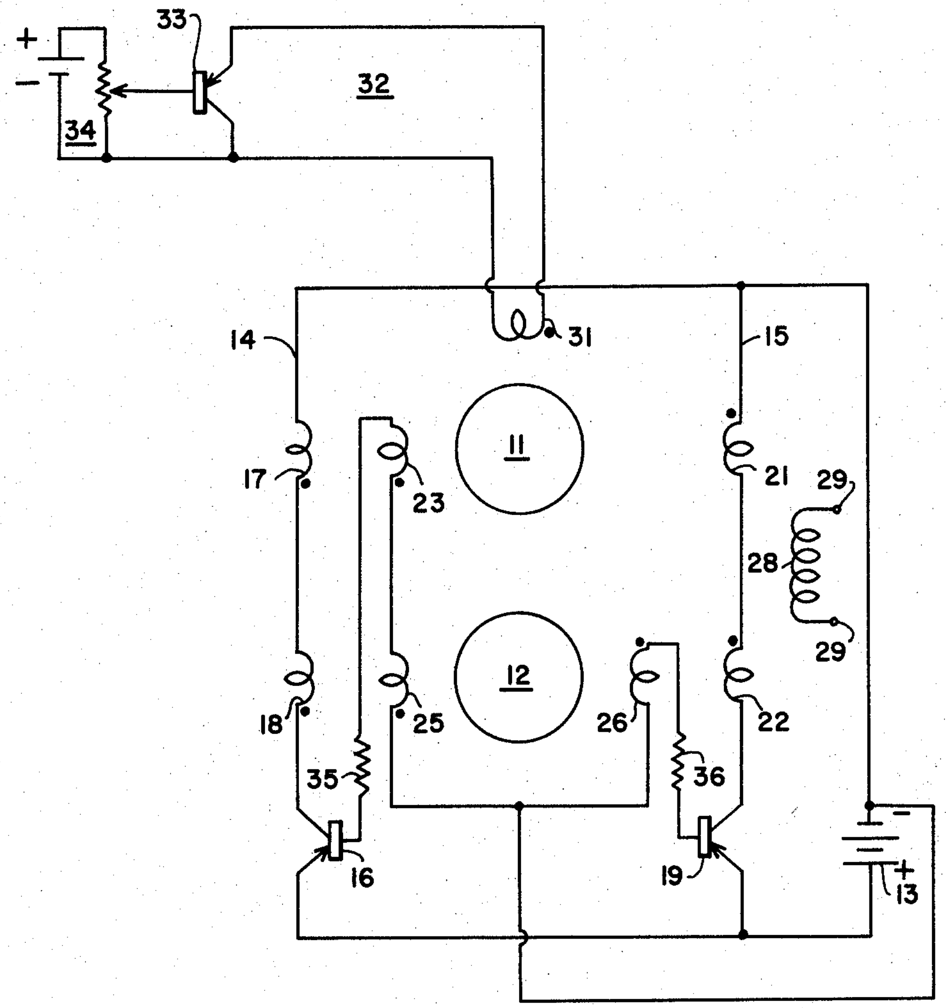
FIG. 3 is a schematic view of an alternative embodiment of this invention.

In the alternative embodiment of the variable frequency multivibrator illustrated in FIG. 3, switching transistor 19 is provided with only base drive winding 26 on uncontrolled core 12, and in lieu of the common limiting resistor 27 of the embodiment of FIG. 1, transistors 16 and 19 are provided with individual resistors 35 and 36, respectively, in the base circuits thereof. To insure proper switching operation of transistor 19, the serially connected resistor 36 and winding 26 are adjusted to saturate transistor 19 during the initial half-cycle of multivibrator operation. Serially connected resistor 35 and windings 23 and 25 are adjusted to provide for similar operation of transistor 16 during the terminal half-cycle.

Obviously numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A multivibrator comprising a pair of magnetic cores having a substantially square wave hysteresis characteristic, a pair of circuit means linking said cores for effecting flux changes therein in opposite directions, circuit switching means interposed therein for rendering each of said pair of circuit means alternately operative, circuit means cooperating with said cores for effecting an alternate mode of operation of said circuit switching means, output means responsive to the flux changes in said cores, a control winding on one of said cores, a variable unidirectional electrical energy source, and circuit means connected between said energy source and said control winding for limiting the magnitude of flux change in said one core correlative to the instantaneous value of the unidirectional electrical energy of said source.

2. A multivibrator comprising a pair of high remanence toroidal cores, first circuit means linking said cores and being operative for effecting a flux change in said cores in one direction, second circuit means linking said cores and being operative for effecting a flux change in said cores in the opposite direction, switching means interposed in said circuit means for rendering said first and second circuit means alternately operative, third circuit means linking said cores for rendering said circuit switching means alternately on and off, output means responsive to the flux changes in said cores, a control winding wound on one of said cores, a variable unidirectional potential energy source, and means intercoupling said control winding and said energy source for limiting the magnitude of flux change in said one core correlative to the instantaneous value of the unidirectional potential of said energy source.

3. A multivibrator comprising a pair of high remanence substantially identical toroidal cores, first circuit means linking said cores and being operative to effect a flux change in said cores in one direction, second circuit means linking said cores and being operative to effect a flux change in said cores in the opposite direction, said first and second circuit means being identical, electrical energy supply means coupled across said first and second circuit means, circuit switching means individual to and interposed in each of said first and second circuit means for rendering the respective circuit means alternately operative and inoperative, third circuit means cooperating with said cores for rendering each of said circuit switching means alternately on and off, output means responsive to the flux changes in said cores, a control winding on one of said cores, a source of selectively variable unidirectional potential of a single polarity, and signal translating means connected between said control winding and said potential source for clamping the voltage induced in said control winding in response to a flux change in one direction to a level determined by the instantaneous magnitude of said unidirectional potential.

4. A multivibrator according to claim 3 wherein said circuit switching means and said signal translating means are transistors of a like type.

5. A multivibrator according to claim 3 wherein said circuit switching means and said signal translating means are PNP type transistors.

6. A multivibrator according to claim 3 wherein said third circuit means includes an impedance having one end thereof connected to said electrical energy supply means, first serially connected windings wound on said cores in one rotational sense and being connected between the other end of said impedance and one of said circuit switching means, and second serially connected windings wound on said cores in the opposite rotational sense and being connected between said other end of said impedance and the other of said circuit switching means.

7. A multivibrator according to claim 3 wherein said third circuit means includes a first winding wound on each of said cores in one rotational sense, a second winding wound on the other one of said cores in the opposite rotational sense, and a pair of impedances, each of which individually connects one of said first and second windings to one of said circuit switching means.

8. A multivibrator comprising a pair of high remanence cores of a toroidal ring configuration, a unidirectional electrical energy source, first and second flux changing windings wound in opposite rotational sense with respect to each other on each of said cores, first and second transistor switching means, said first flux changing windings and said first transistor switching means being serially connected to form a first current conductive loop across said energy source, said second flux changing windings and said second transistor switching means being serially connected to form a second current conductive loop across said energy source, impedance means, a third base drive winding wound on each of said cores in the same rotational sense, a fourth base drive winding wound on at least one of said cores in a rotational sense opposite to that of said third winding, first circuit means serially connecting said third winding and said impedance means between the base electrode of said first transistor switching means and one side of said energy source, second circuit means serially connecting said fourth winding and said impedance means between the base electrode of said second transistor switching means and said one side of said energy source, an output winding linking both of said cores, a control transistor, a fifth winding wound on one of said cores and being connected across the emitter and collector electrodes of said control transistor, and a source of a selectively variable unidirectional electrical signal connected across the base and collector electrodes of said control transistor.

9. A multivibrator according to claim 8 wherein said selectively variable unidirectional electrical signal of said source is of a single polarity.

10. A multivibrator according to claim 8 wherein said high remanence cores are of the same inside diameter, and said first and second flux changing windings are identical.

11. A multivibrator comprising a pair of high remanence cores of a toroidal ring configuration, a unidirectional electrical energy source, first and second flux changing windings wound in opposite rotational sense with respect to each other on each of said cores, first and second transistor switching means, said first flux changing windings and said first transistor switching means being serially connected to form a first current conductive loop across said energy source, said second flux changing windings and said second transistor switching means being serially connected to form a second current conductive loop across said energy source, a resistor having one end thereof connected to one side of said energy source, third and fourth base drive windings wound in the opposite rotational sense with respect to each other on each of said cores, first circuit means serially connecting said third windings between the base electrode of said first transistor switching means and the other end of said resistor, second circuit means serially connecting said fourth windings between the base electrode of said second transistor switching means and said other end of said resistor, an output winding linking both of said cores, a control transistor, a fifth winding wound on one of said cores and being connected across the emitter and collector electrodes of said control transistor, and a source of a selectively variable unidirectional electrical signal connected across the base and collector electrodes of said control transistor.

12. A multivibrator according to claim 11 wherein said selectively variable unidirectional electrical signal of said source is of a single polarity.

13. A multivibrator according to claim 11 wherein said high remanence cores are of the same inside diameter, and said first and second flux changing windings are identical.

14. A multivibrator comprising a pair of high remanence cores of a toroidal ring configuration, a unidirectional electrical energy supply, first and second flux changing windings wound in opposite rotational sense with respect to each other on each of said cores, first and second transistor switching means, said first flux changing windings and said first transistor switching means being serially connected to form a first current conductive loop across said energy supply, said second flux changing windings and said second transistor switching means being serially connected to form a second current conductive loop across said energy supply, first and second resistors having one end thereof connected to the base electrodes of said first and second transistor switching means, respectively, third base drive windings wound on each of said cores in the same rotational sense and being serially connected between said first resistor and one side of said energy source, a fourth base drive winding wound on one of said cores in a rotational sense opposite to that of said third windings and being serially connected between said second resistor and said one side of said energy source, an output winding linking both of said cores, a control transistor, a fifth winding wound on the other of said cores and being connected across the emitter and collector electrodes of said control transistor, and a source of a selectively variable unidirectional electrical signal connected across the base and collector electrodes of said control transistor.

15. A multivibrator according to claim 14 wherein said selectively variable unidirectional electrical signal of said source is of a single polarity.

16. A multivibrator according to claim 14 wherein said high remanence cores are of the same inside diameter, and said first and second flux changing windings are identical.

17. A multivibrator comprising a plurality of magnetic cores each having a substantially square wave hysteresis characteristic, circuit means linking said cores for effecting flux changes in opposite directions therein, means responsive to the magnetic condition of said cores for controlling said circuit means, output means responsive to the flux changes in said cores and adjustable means associated with all but one of said plurality of magnetic cores for limiting the magnitude of flux change in said associated cores in one direction.

18. A multivibrator comprising a plurality of magnetic cores each having a substantially square wave hysteresis characteristic, a pair of circuit means linking said cores for effecting flux changes therein in opposite directions, switching means included therewith for rendering each of said pair of circuit means alternately operative, means associated with said cores for effecting an alternate mode of operation of said switching means, output means responsive to the flux changes in said cores and adjustable control means associated with all but one of said plurality of magnetic cores for limiting the magnitude of flux change in said associated cores in one direction.

References Cited in the file of this patent

UNITED STATES PATENTS 2,939,115 Bobeck ---------------- May 31, 1960

OTHER REFERENCES

AIEE Transactions, Part I, vol. 74, pages 356 to 361, "A Variable Frequency Magnetic-Coupled Multivibrator," by Van Allen, July 1955.